United States Patent
Bhagwan et al.

(10) Patent No.: US 10,791,084 B2
(45) Date of Patent: Sep. 29, 2020

(54) AUTOMATIC ELECTRONIC MESSAGE CONTENT RATING METHOD AND APPARATUS

(71) Applicant: OATH INC., New York, NY (US)

(72) Inventors: Varun Bhagwan, Los Gatos, CA (US); Doug Sharp, San Francisco, CA (US); Suhas Sadanandan, Pleasonton, CA (US); Sindhuja Sridharan, Mountain View, CA (US)

(73) Assignee: OATH INC., New York, NY (US)

( * ) Notice: Subject to any disclaimer, the term of this patent is extended or adjusted under 35 U.S.C. 154(b) by 206 days.

(21) Appl. No.: 15/285,166

(22) Filed: Oct. 4, 2016

(65) Prior Publication Data

US 2018/0097766 A1    Apr. 5, 2018

(51) Int. Cl.
| | |
|---|---|
| *G06F 17/28* | (2006.01) |
| *G06F 15/17* | (2006.01) |
| *H04L 12/58* | (2006.01) |
| *G06F 16/22* | (2019.01) |
| *G06F 16/23* | (2019.01) |
| *G06F 3/0481* | (2013.01) |

(52) U.S. Cl.
CPC ............ *H04L 51/26* (2013.01); *G06F 3/0481* (2013.01); *G06F 16/22* (2019.01); *G06F 16/23* (2019.01); *H04L 51/32* (2013.01)

(58) Field of Classification Search
None
See application file for complete search history.

(56) References Cited

U.S. PATENT DOCUMENTS

| | | | |
|---|---|---|---|
| 9,231,897 B1 * | 1/2016 | Liden | H04L 51/12 |
| 2005/0091319 A1 * | 4/2005 | Kirsch | H04L 51/12 709/206 |
| 2005/0097319 A1 * | 5/2005 | Zhu | G06Q 10/00 713/166 |
| 2005/0201006 A1 * | 9/2005 | Ellis | G11B 15/685 360/92.1 |
| 2007/0078973 A1 * | 4/2007 | Kussmaul | G06Q 10/107 709/224 |
| 2009/0112648 A1 | 4/2009 | Lee et al. | |
| 2009/0299824 A1 * | 12/2009 | Barnes, Jr. | G06Q 30/0207 705/7.39 |
| 2009/0300547 A1 * | 12/2009 | Bates | G06F 17/30873 715/825 |

(Continued)

*Primary Examiner* — Natisha D Cox
(74) *Attorney, Agent, or Firm* — James J. DeCarlo; Greenberg Traurig, LLP

(57) ABSTRACT

Disclosed are systems and methods for improving interactions with and between computers in content generating, searching, hosting and/or providing systems supported by or configured with personal computing devices, servers and/or platforms. The systems interact to identify and retrieve data within or across platforms, which can be used to improve the quality of data used in processing interactions between or among processors in such systems. The disclosed systems and methods provide systems and methods for automatically generating an aggregate rating for an electronic message using one or both of explicit and implicit rating input from a number of recipients of the electronic message. The disclosed systems and methods communication information about the electronic message using the aggregate rating.

22 Claims, 11 Drawing Sheets

(56) References Cited

U.S. PATENT DOCUMENTS

| | | | |
|---|---|---|---|
| 2010/0057856 A1* | 3/2010 | O'Sullivan | H04L 51/12 709/206 |
| 2011/0208592 A1* | 8/2011 | Golder | G06Q 30/02 705/14.66 |
| 2012/0198017 A1* | 8/2012 | LeVasseur | H04L 63/168 709/206 |
| 2012/0278166 A1* | 11/2012 | Badros | G06Q 30/0251 705/14.53 |
| 2012/0278168 A1* | 11/2012 | O'Hara | G06Q 30/0271 705/14.53 |
| 2014/0122246 A1 | 5/2014 | Johnson et al. | |
| 2015/0066644 A1 | 3/2015 | Narasimhan et al. | |
| 2018/0018581 A1* | 1/2018 | Cook | H04L 67/10 |

* cited by examiner

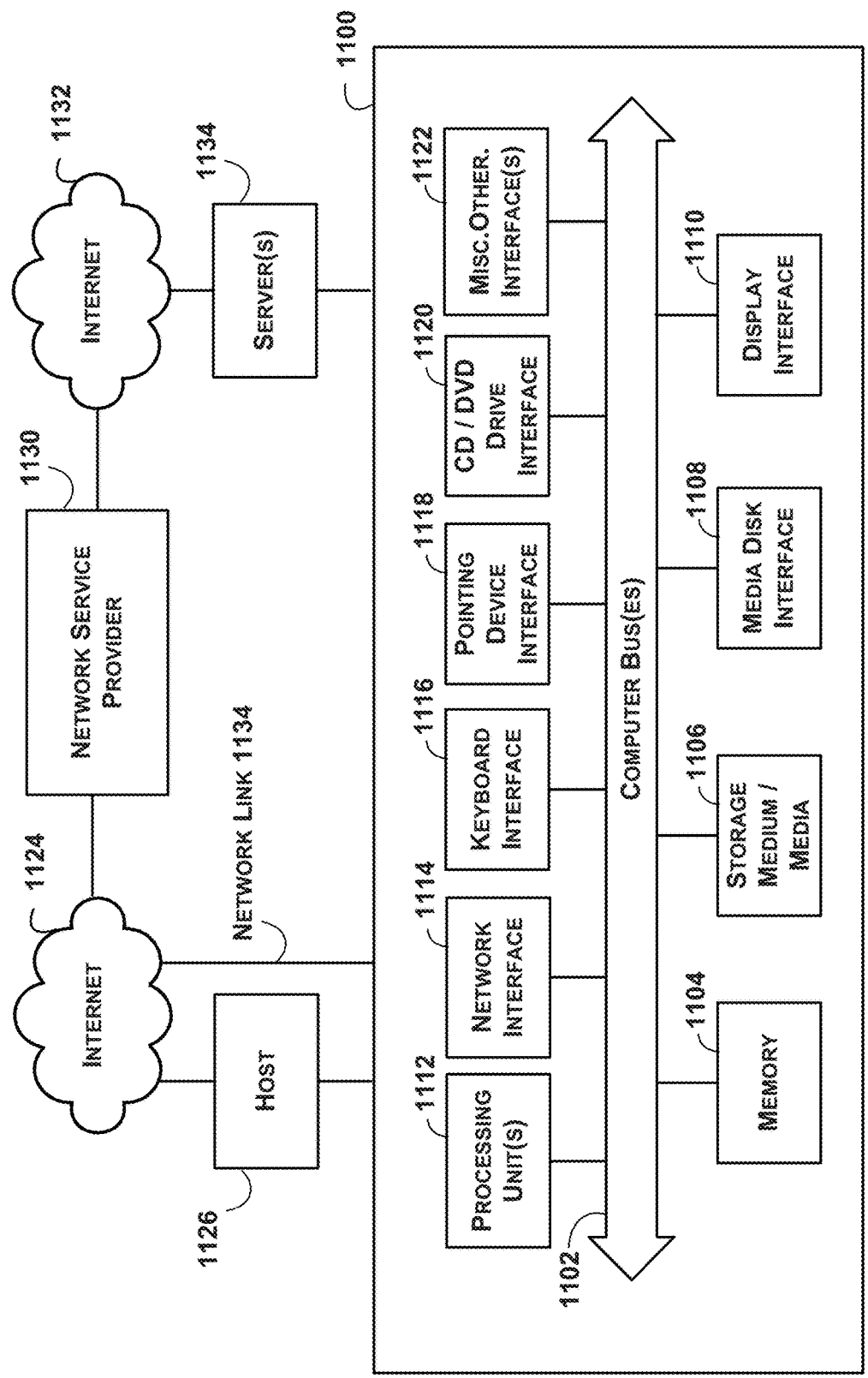

US 10,791,084 B2

AUTOMATIC ELECTRONIC MESSAGE CONTENT RATING METHOD AND APPARATUS

FIELD OF THE DISCLOSURE

The present disclosure relates to electronic messages, and more particularly to generating a rating for an electronic message using implicit (or implied) and explicit (or express) rating input received from electronic message recipients and providing electronic message ratings information to the electronic messaging recipients.

BACKGROUND

Most computer users use at least one electronic messaging system to communicate electronically with other users or entities. Current electronic messaging systems receive an electronic message from a sender and forward the electronic message to a recipient, or recipients, identified by the sender's electronic message. It has become increasingly more difficult for a computer user to manage the volume of electronic messages received by the user.

SUMMARY

The present disclosure provides novel systems and methods for automatically generating a rating for an electronic message using one or both of explicit (or express) rating input and implicit (or implied) rating input. Implicit rating input is determined by observing the behavior of recipients of the electronic message with respect to the electronic message (e.g., the action(s) taken by a recipient in connection with an electronic message). Embodiments of the present disclosure improve existing electronic messaging computer technology and provide a mechanism for determining a rating for an electronic message using explicit and/or implicit rating input from a number of recipients of the electronic message, and using the determined rating for each recipient of the electronic message. A determined rating can be used by an electronic messaging system for distributing, filtering, ordering and presenting electronic messages to message recipients, for example. This presents improvements to the quality of, and distribution of, electronic messaging content. Additionally, an electronic messaging system including the features disclosed herein facilitate a user's use of the system, which increases user satisfaction with, and allegiance to, the electronic messaging system.

Presently, electronic messaging systems are typically presented in chronological order in an inbox, mail folder or user interface presentation of electronic messages, with the newest electronic messages being displayed first. Embodiments of the present disclosure determine a rating for an electronic message using feedback from one or more message recipients of the electronic message. By way of a non-limiting example, an electronic messaging system can present rating information with an electronic message in an electronic message listing, and the electronic messaging user can use the rating information, e.g., the user can use the rating information to determine whether or not to open and/or read the electronic message, click on a universal resource locator (URL) or link contained in the electronic message, or the like.

According to some embodiments, the disclosed systems and methods receive, at a server computing device in an electronic messaging system, a request for an electronic message from a client computing device. The electronic message is sent from a sender and is directed to a plurality of recipients. The electronic message can be an electronic mail message, text message, or the like. The electronic message is sent to a client computing device in response to the request, which results in the electronic message, or some portion thereof, being displayed at the client computing device in a user interface, which comprises a rating user interface element, such that the electronic message (or some portion thereof) and the rating user interface element are included in the user interface displayed at the client computing device. The rating user interface element is selectable by the user of the client computing device, e.g., a recipient of the electronic message, to rate the electronic message.

The disclosed systems and methods then monitor activity of the user (electronic message recipient) and receive input indicative of a rating of the electronic message by the user. The input can be from the rating user interface element. In which case, the input is indicative of an explicit rating by the user of the electronic message (e.g., the contents of the electronic message). Alternatively, or in addition to an explicit rating, the user's behavior (or action(s) performed) in connection with the electronic message can be received as implicit (or implied) rating input. An action taken by the user can be a positive or a negative action. Some examples of positive actions that might be taken by a user (or electronic message recipient) in connection with an electronic message include moving the electronic message from a spam folder to the user's inbox (or other folder), clicking on a universal resource locator (or link) contained in the electronic message, moving the electronic message (from the user's inbox) to a personal folder, flagging (e.g., starring or other "favorite" marking) the electronic message, or the like. Some examples of negative actions include deleting the electronic message (e.g., moving the electronic message to a trash folder or bin), marking the electronic message as spam (e.g., moving the electronic message to a spam folder), or the like. Each positive action and each negative action can have an associated implicit rating value. For example, a positive action can have a positive rating value (e.g., a value of 1), while a negative action can have a negative rating value (e.g., a value of −1). Of course, different positive and negative implicit rating values can be used, and different implicit rating values can be used for different actions. For example, an action marking the electronic message as spam might have a greater negative rating value (such as −2) than an action deleting the electronic message (which might be assigned a −1 rating value).

The disclosed systems and methods then generate a rating, or score, (or aggregate rating or score) for the electronic message using input received from a number of the recipients of the electronic message. In some embodiments, the rating input (explicit and/or implicit) of each recipient of the number is maintained, e.g., in a database or other data store, and is combined (or aggregated) with the input of each other recipient of the number of recipients. The aggregate rating value can be maintained for an electronic message. A recipient's rating of the electronic message determined from the recipient's rating input (explicit and/or implicit rating input) can be maintained for the electronic message. A recipient's explicit rating input and implicit rating input can be maintained for the electronic message. The disclosed systems and methods then communicate information indicative of the aggregate rating determined for the electronic message to a client computing device of a recipient of the electronic message. Communication of the aggregate rating information to a client computing device results in the user interface display being updated based on the aggregate rating determined for the electronic message using the received rating input. In one example, the information that is communicated can be the aggregate rating determined for the electronic message, and the user interface displays the aggregate rating along with at least a portion of the electronic message (e.g., in a listing of electronic messages including the electronic message with the aggregate rating determined for the electronic message). As yet another example, the user interface can be updated to display a summary of a number of electronic messages (e.g., a number of highly-rated electronic messages).

It will be recognized from the disclosure herein that embodiments of the instant disclosure provide improvements to a number of technology areas, for example those related to systems and processes that handle or process electronic messaging content for distribution and delivery to users over the internet, such as but not limited to, electronic messaging platforms, servers, electronic social networking platforms and the like. The disclosed systems and methods can effectuate increased speed and efficiency in the ways that users can access and use electronic messages, thereby minimizing user effort, as the disclosed systems and methods, inter alia, provide rating information for use in handling electronic messages. Users are provided with improved electronic messaging presentation and an improved electronic messaging experience through the disclosed systems' and methods' determination of an aggregate rating for each of a number of electronic messages. For example, the disclosed electronic message aggregate rating can be used by an electronic messaging system for distributing, filtering, ordering and presenting electronic messages to message recipients. This presents improvements to the quality of, and distribution of, electronic messaging content. Additionally, an electronic messaging system including the features disclosed herein facilitate a user's use of the system, which increases user satisfaction with, and allegiance to, the electronic messaging system.

In accordance with one or more embodiments, a method is disclosed which includes receiving, at a server computing device in an electronic messaging system and over an electronic communications network from a number of client computing devices, a request for an electronic message sent by a sender and directed to a plurality of recipients by a sender, each client computing device of the number corresponding to a recipient of the plurality of recipients; communicating, via the server computing device over the electronic communications network to the number of client computing devices, the electronic message, communication of the electronic message to a client computing device of the number of client computing devices resulting in display, at the client computing device, of the electronic message in a user interface along with a rating user interface element selectable to provide an explicit rating of the electronic message; receiving, at the server computing device over the electronic communications network, input indicative of a rating of the electronic message by each of a number of recipients of the plurality of recipients; determining, via the server computing device, an aggregate rating for the electronic message using the input indicative of a rating of the electronic message received from the number of recipients of the plurality; communicating, via the server computing device over the electronic communications network to the client computing device of a recipient of the plurality, information indicative of the aggregate rating determined for the electronic message, communication of the aggregate rating information to the client computing device of the recipient of the electronic message resulting in the user interface displayed at the computing device of a recipient of the plurality being updated based on the aggregate rating determined for the electronic message using the received rating input.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatically rating electronic messages.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 5:
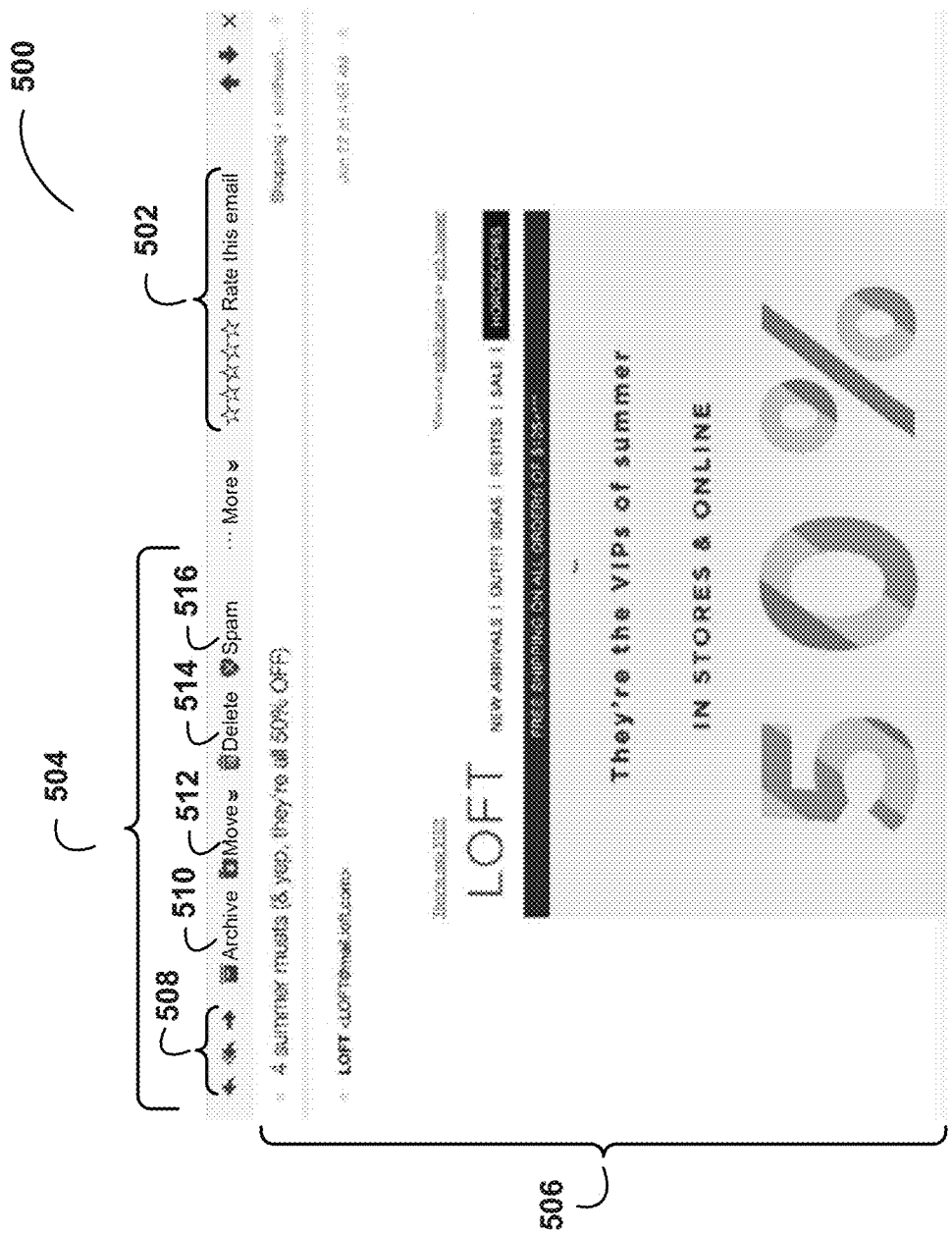
Figure 6:
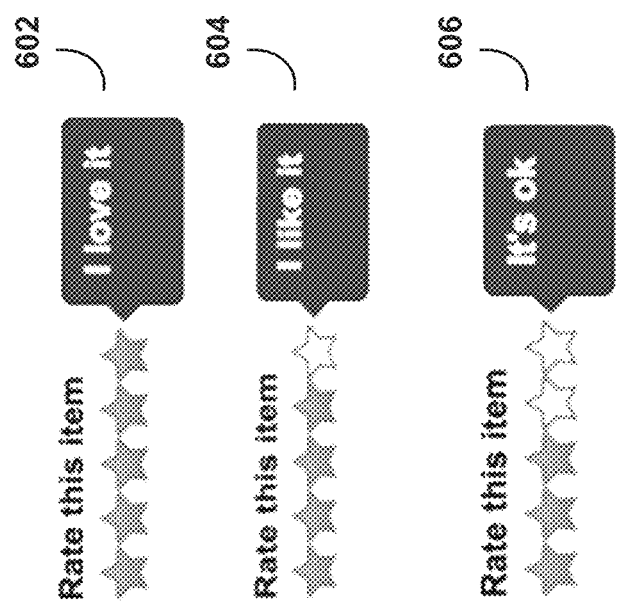
Figure 7:
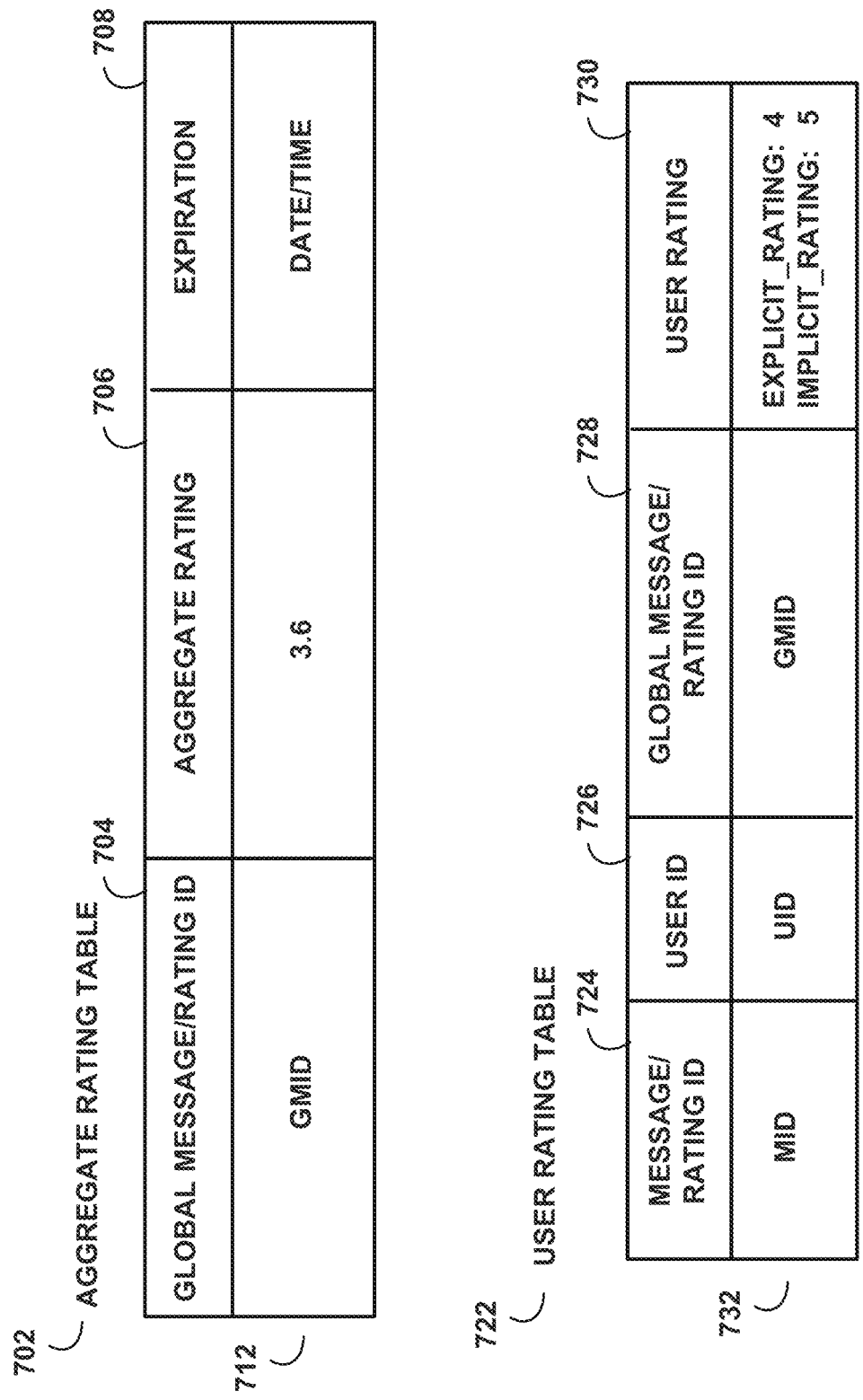
Figure 8:
Figure 9:
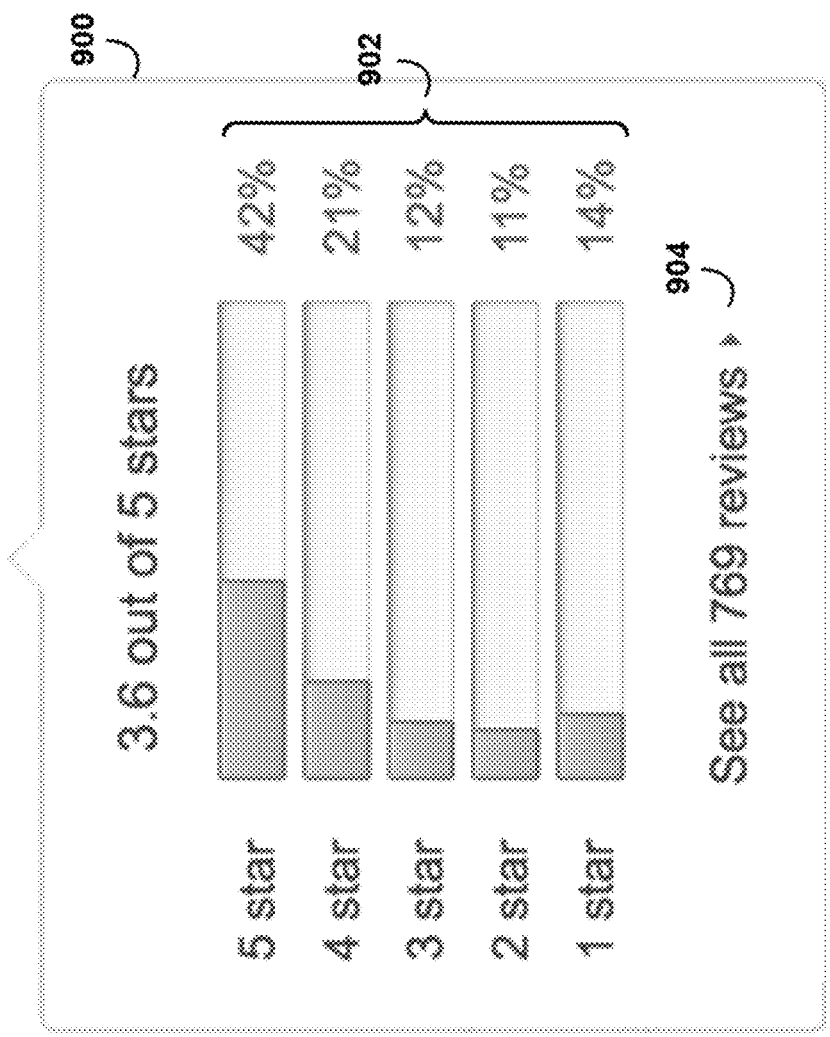
Figure 10:
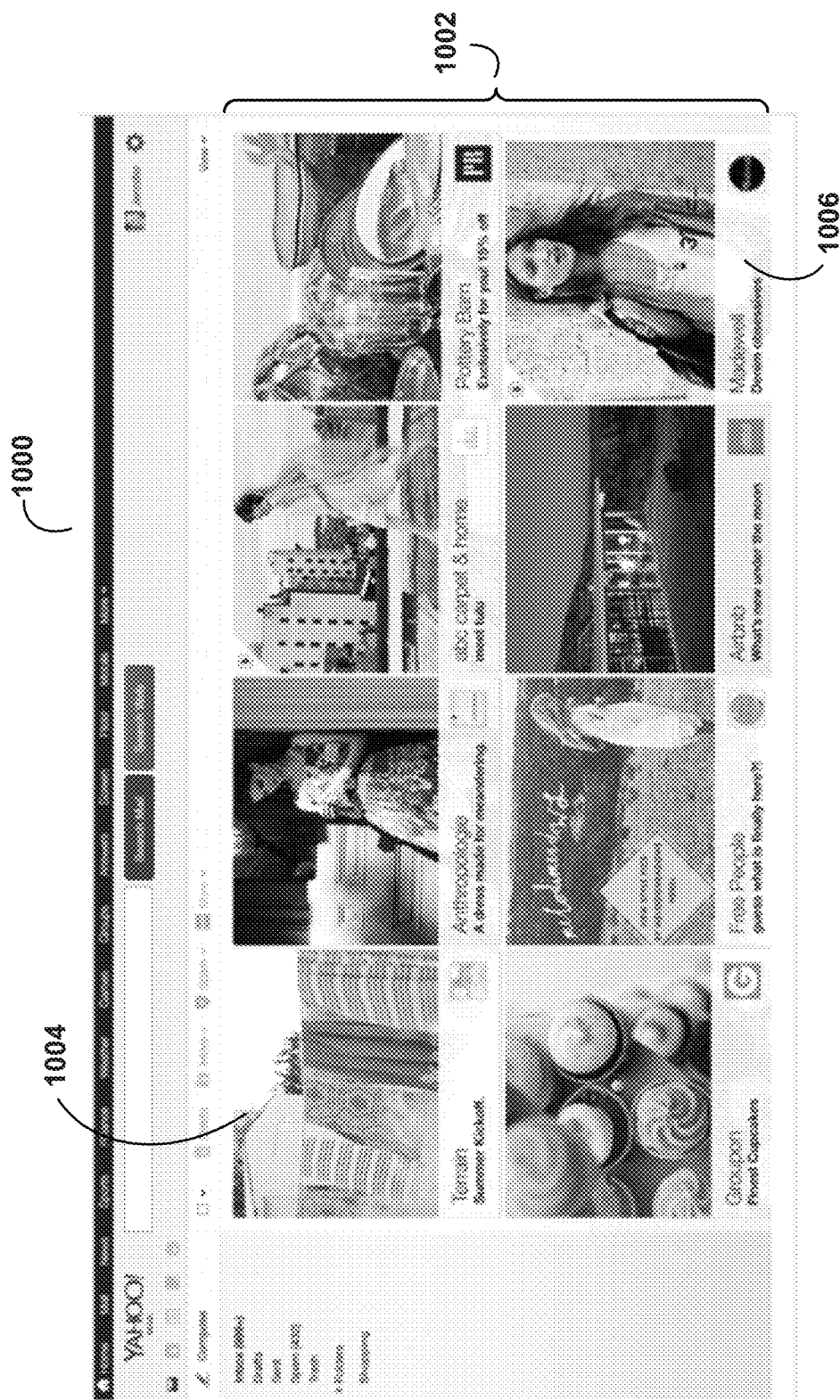

FIG. 5 provides an exemplary user interface example of a non-limiting embodiment in accordance with some embodiments of the present disclosure;

FIG. 6 provides an exemplary user interface example of a non-limiting embodiment in accordance with some embodiments of the present disclosure;

FIG. 7 is a diagram of an exemplary example of a non-limiting embodiment in accordance with some embodiments of the present disclosure;

FIG. 8 provides an exemplary user interface example of a non-limiting embodiment in accordance with some embodiments of the present disclosure;

FIG. 9 provides an exemplary user interface example of a non-limiting embodiment in accordance with some embodiments of the present disclosure;

FIG. 10 provides an exemplary user interface example of a non-limiting embodiment in accordance with some embodiments of the present disclosure; and FIG. 11 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a wired or wireless line or link, for example.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a simple smart phone, phablet or tablet may include a numeric keypad or a display of limited functionality, such as a monochrome liquid crystal display (LCD) for displaying text. In contrast, however, as another example, a web-enabled client device may include a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or Windows Mobile, or the like.

A client device may include or may execute a variety of possible applications, such as a client software application enabling communication with other devices, such as communicating one or more messages, such as via an electronic mail messaging service, for example Yahoo!® Mail, short message service (SMS), or multimedia message service (MMS), for example Yahoo! Messenger®, including via a network, such as a social network, including, for example, Tumblr®, Facebook®, LinkedIn®, Twitter®, Flickr®, or Google+®, Instagram™, to provide only a few possible examples. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues). The foregoing is provided to illustrate that claimed subject matter is intended to include a wide range of possible features or capabilities.

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, an electronic message comprises content that is transmitted between a sender and a recipient(s) via an electronic messaging system. Examples of an electronic message include an electronic mail message, an electronic instant message, an electronic short message, an electronic multimedia message, and the like. Examples of an electronic message system include an electronic mail system, a short message service (SMS) system, a multimedia message service (MMS) system, and the like.

An electronic message is typically directed to a user via an electronic messaging system providing an electronic messaging service using the user's account with the electronic messaging system. The electronic message sent to the user's electronic mail address can be accessed by the user using a client application (e.g., a client application provided by the electronic messaging system) or using a browser to access a web site of a provider of the electronic messaging service.

By way of background, users receive a number of electronic messages, such as electronic mail (or email) messages, every day. Many of the email message sent to the user (or recipient) are sent to a number of other users (or recipients). For example, a user may belong to a professional, or other, organization, club, etc., which regularly sends emails to its members. As yet another example, the user may be on a mailing list of a sender, such as a brick and mortar and/or an online retailer, a blogger, a newsletter writer, a marketer, product manufacturer, service provider, etc. sender. In order to ascertain whether an electronic message is of interest to the recipient, the recipient must open and read the electronic message; however, given the volume of electronic messages received by a recipient even on a daily basis, it is difficult for the recipient to open and read each electronic message.

With the volume of electronic messages being sent and received, there is a need for a mechanism to assist in perusing the electronic messages. However, existing electronic messaging systems are cumbersome to use because they require users to manually sort through the electronic messages based on very limited information, e.g., sender name and subject. Moreover, each recipient of an electronic message sent to a number of recipients must make their own determination whether to open and read the electronic message based on such limited information.

For example, conventional email systems typically provide a listing of the electronic messages in a finite-size display space with a limited amount of space devoted to each message in the list to display a limited amount of information per message, such as sender information, subject, date, time, size, attachment indicator. Each recipient must use the limited amount of information provided to make a determination whether or not to open and read the electronic message. The conventional approach to determining whether an electronic message is of interest to the user quickly becomes extremely onerous on the electronic message recipient, and each recipient must make their own independent determination.

As such, the instant disclosure provides a novel solution addressing these and other problems with an automated system, application and/or platform that generates an aggregate rating for an electronic message using explicit and/or implicit feedback (or input) received from each of a number of recipients of the electronic message that provide such feedback, so that the aggregate rating can be shared with each recipient of the electronic message. In some embodiments, the aggregate rating for an electronic message is crowdsourced from rating input received from a number of recipients of the electronic message.

According to some embodiments, the disclosed systems and methods can determine whether an electronic message is one for which an aggregate rating is to be generated. For example, an electronic message that is sent to more than one recipient can be an electronic message for which a rating is generated. As yet another example, an electronic message may be identified for an aggregate rating based on the sender, e.g., an electronic message whose sender is found in a listing of senders is identified as being an electronic message for which an aggregate rating is to be generated. By way of another example, an electronic message containing an offer, or offers, may be identified as a candidate for generating an aggregate rating. A data store storing message data, e.g., sender, recipient, subject, message body, etc., can be modified to store information about each message for which an aggregate rating is being determined. In some embodiments, the data store can include a new database table, e.g., an aggregate rating table, which includes an entry for each electronic message for which an aggregate rating is being determined. In addition, a new table can be added, or an existing table modified, to store a user's rating data, e.g., explicit rating input, implicit rating input, observed behavior, for an electronic message.

The disclosed systems and methods provide electronic message recipients with a listing of messages using an electronic messaging client application, a web browser application, or other application. A user interface including an electronic message listing display can further include at least one user interface element (or control) selectable by the recipient to provide feedback (explicit rating input and/or implicit rating input) for the electronic message. By way of a non-limiting example, at least one control can be selectable by a recipient to specify an explicit rating. In addition or as an alternative, one or more user interface elements can be monitored for selection by the recipient, and such observed behavior can be used as implicit rating input for generating an implicit rating for the electronic message. A recipient's explicit rating input and/or implicit rating input can be used in generating the recipient's rating for the electronic message, and the recipients rating for the electronic message can be aggregated with each other recipient of the electronic message that provide rating input (e.g., explicit and/or implicit rating input) for the electronic message.

The disclosed systems and methods use a recipient's feedback, e.g., explicit rating and/or implicit rating input from observed behavior (or action(s)), to determine the recipient's rating of an electronic message, and an aggregate rating is determined for the electronic message using each rating determined for a recipient that provides feedback in connection with the electronic message. In a listing of messages provided to a user, an electronic message's aggregate rating can be displayed and used to sort the electronic messages based on each message's aggregate rating. A recipient's messages may be selected based on aggregate rating, e.g., a number of the highest-rated messages can be selected and displayed, e.g., in a summary page, with each message being represented in the summary using information extracted from the electronic message (or information obtained from information extracted from the electronic message).

The benefits of the disclosed systems and methods can be evidenced two-fold: 1) the disclosed systems and methods provide a technologically based mechanism for automatic rating of electronic messages using at least one of explicit rating feedback and observed behavior, or implicit rating feedback; and (2) the proposed systems and methods provide a technologically based mechanism for aggregating feedback provided by a number of recipients and for providing an aggregate rating to each message recipient, so that the aggregate rating can be used, for example, to an electronic message recipient and/or used in filtering messages for display for the electronic message recipient. Thus, the disclosed systems and methods, for example, generate an aggregate rating for a number of message recipients using feedback received from at least one of the electronic message recipients, and use the aggregate rating for displaying messages for the electronic message recipient.

The disclosed systems and methods can be implemented for any type of electronic message, including but not limited to electronic mail (or email) message, an electronic short message service (SMS) message, an electronic text message, an electronic multimedia message service (MMS) message, and/or any other type of electronic messaging content. While the discussion herein will focus on email messages, it should not be construed as limiting, as any type of messaging content, whether known or to be known, can be utilized without departing from the scope of the instant disclosure.

Figure 1:
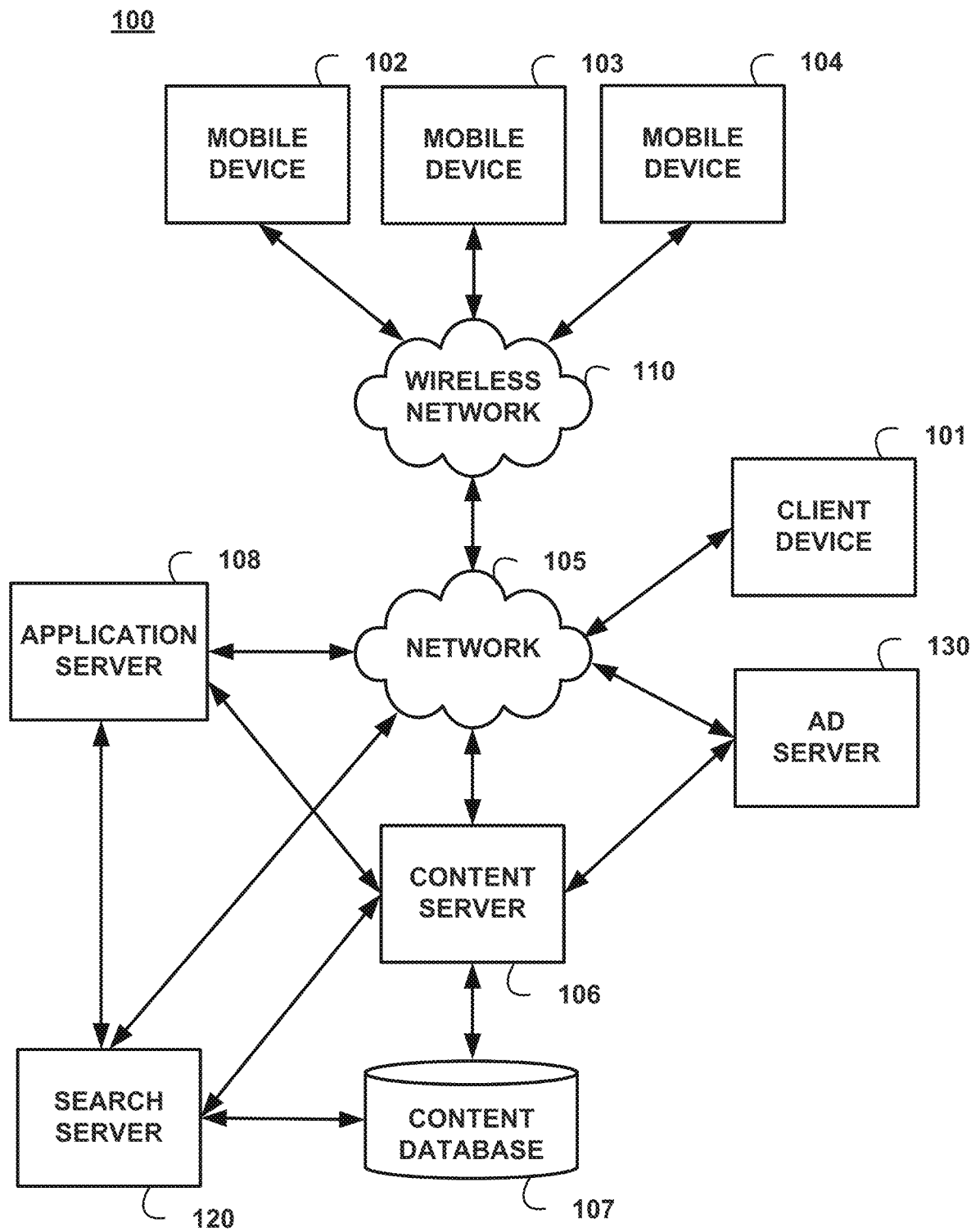
FIG. 1 is a schematic diagram illustrating an example of a network within which the systems and methods disclosed herein could be implemented according to some embodiments of the present disclosure.

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108, search server 120 and advertising ("ad") server 130.

One embodiment of mobile devices 102-104 is described in more detail below. Generally, however, mobile devices 102-104 may include virtually any portable computing device capable of receiving and sending an electronic message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and an HD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send an electronic message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another, and/or other computing devices.

Within the communications networks utilized or understood to be applicable to the present disclosure, such networks will employ various protocols that are used for communication over the network. Signal packets communicated via a network, such as a network of participating digital communication networks, may be compatible with or compliant with one or more protocols. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

According to some embodiments, the present disclosure may also be utilized within or accessible to an electronic social networking site in connection with a social networking service. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refer to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108, 120 and 130 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally, a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

In some embodiments, users are able to access services provided by servers 106, 108, 120 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120 and/or 130.

Moreover, although FIG. 1 illustrates servers 106, 108, 120 and 130 as single computing devices, respectively, the disclosure is not so limited. For example, one or more functions of servers 106, 108, 120 and/or 130 may be distributed across one or more distinct computing devices. Moreover, in one embodiment, servers 106, 108, 120 and/or 130 may be integrated into a single computing device, without departing from the scope of the present disclosure.

Figure 2:
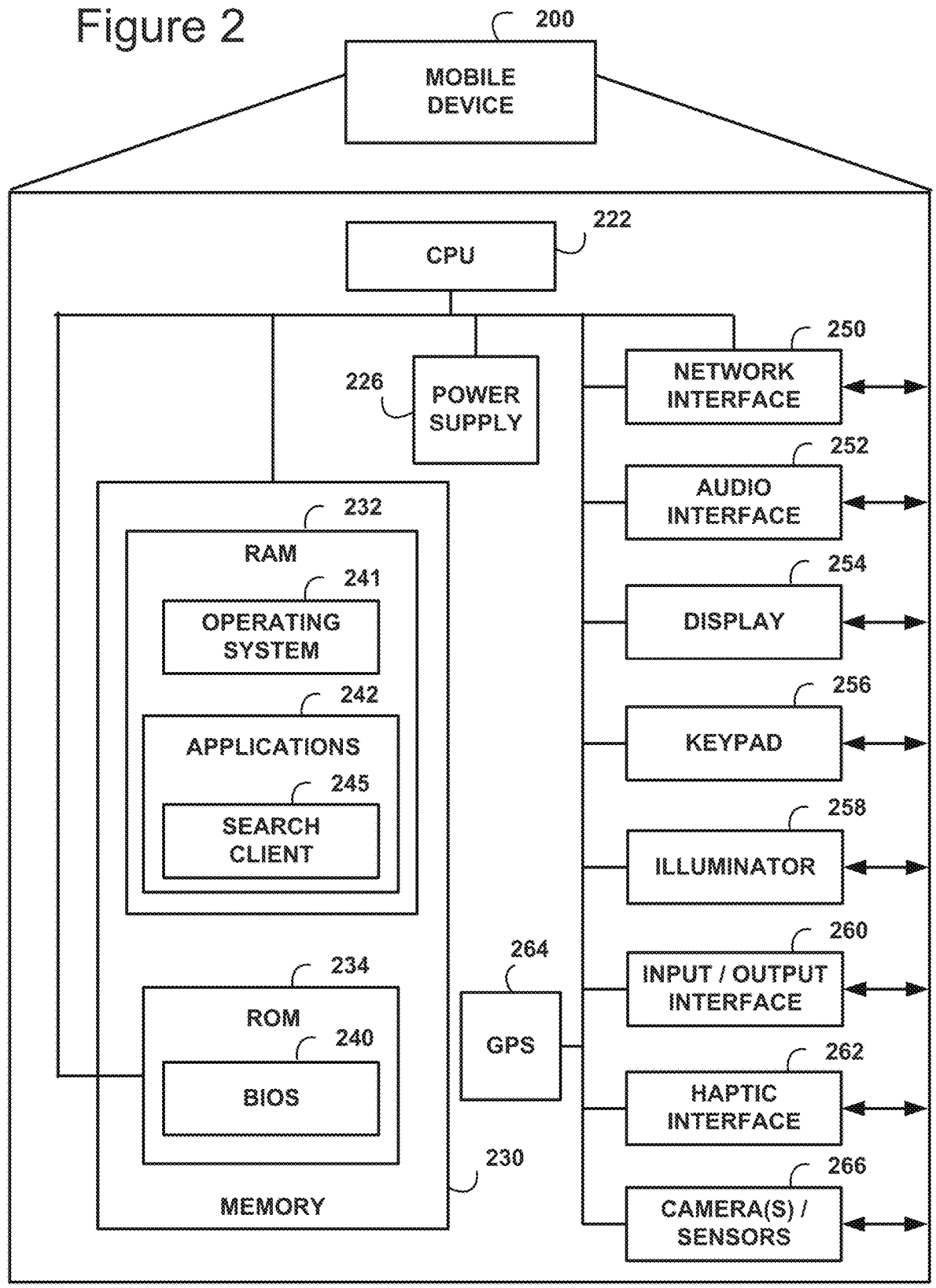
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling Client device 200 to one or more networks, and is constructed for use with one or more communication protocols and technologies as discussed above. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when the client device 200 receives a communication from another user.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, client device 200 may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Client™, or the Symbian® operating system. The operating system may include, or interface with a Java virtual machine module that enables control of hardware components and/or operating system operations via Java application programs.

Memory 230 further includes one or more data stores, which can be utilized by client device 200 to store, among other things, applications 242 and/or other data. For example, data stores may be employed to store information that describes various capabilities of client device 200. The information may then be provided to another device based on any of a variety of events, including being sent as part of a header during a communication, sent upon request, or the like. At least a portion of the capability information may also be stored on a disk drive or other storage medium (not shown) within client device 200.

Applications 242 may include computer executable instructions which, when executed by client device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed. For example, one search client may be configured to enter a search query message, where another search client manages search results, and yet another search client is configured to manage serving advertisements, IMs, emails, and other types of known messages, or the like.

Having described the components of the general architecture employed within the disclosed systems and methods, the components' general operation with respect to the disclosed systems and method will now be described below.

Figure 3:
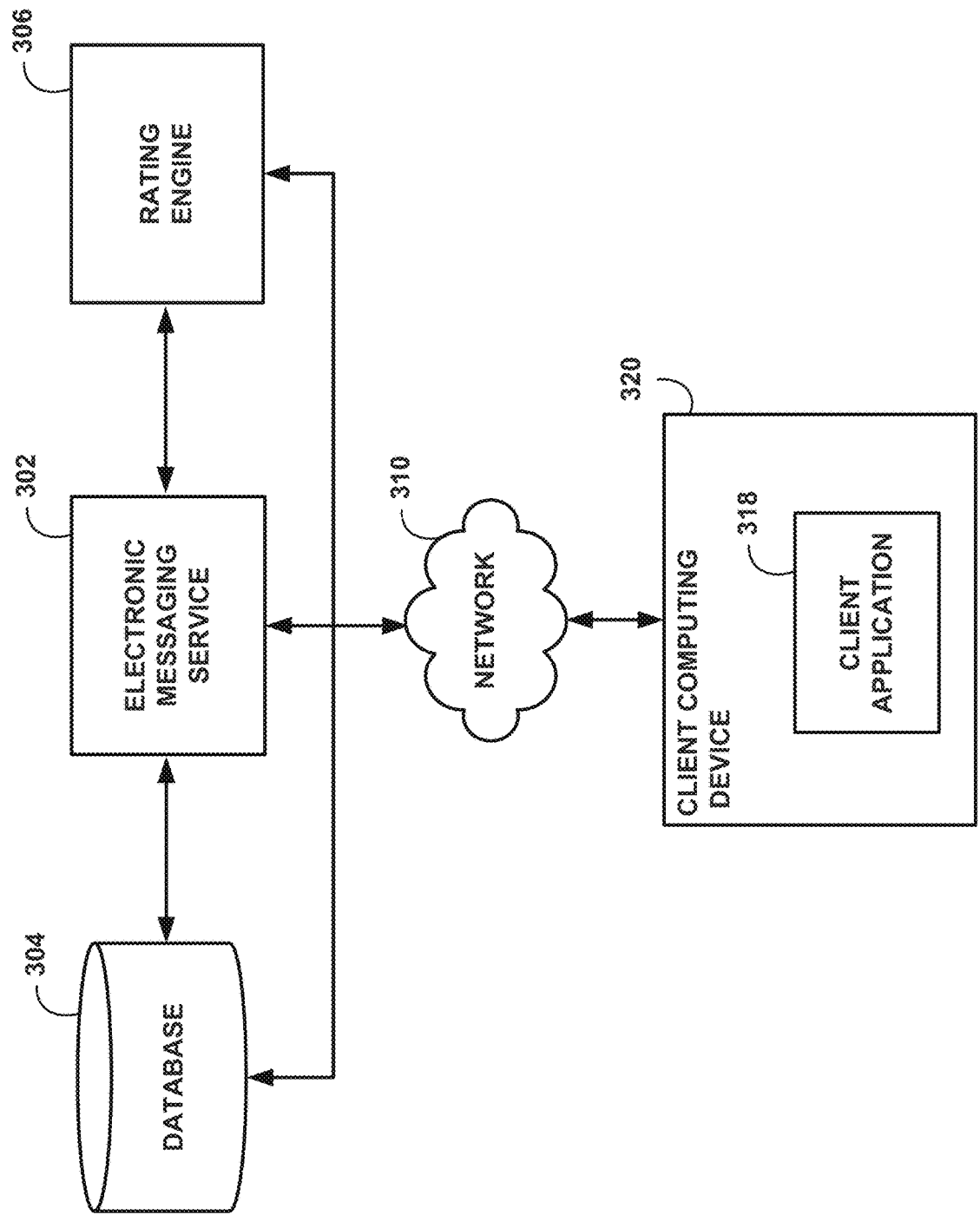
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes an electronic messaging service 302, a network 310, a rating engine 306, and a client computing device(s) 320. By way of some non-limiting examples, the electronic messaging service 302 and the rating engine 306 can be hosted by one or more server computing devices in an electronic messaging system of an electronic messaging service provider. In some embodiments, the electronic messaging service 302 and the rating engine 306 can each be a web-based application accessible by the client computing device 320 over the network 310. The client computing device 320 can be mobile device 102 or client device 101, for example.

The rating engine 306 can be a special purpose machine or processor and could be hosted by an electronic messaging system server, such as a web server, backend server, frontend server, application server, and the like, or any combination thereof. By way of a further exemplary explanation, the rating engine 306 can be installed as a script, program or application augmenting another application. The rating engine 306 is shown as being external to the electronic messaging service 302; however, the rating engine 306 can be an internal script, program or application of the electronic messaging service 302.

The rating engine 306 can be in communication with a client application 318 executing on a client computing device 320 using network 310. Client application 318 can comprise one or more client applications. Some examples of client application 318 comprise a browser application, an electronic mail client application (e.g., Yahoo! ® mail client application), an electronic text messaging client application, a social networking client application, and the like. In some embodiments, the rating engine 306 is in communication with client application 318 to obtain one or both of explicit and implicit message input (or feedback) on an electronic message. Regardless of which component(s) is used to obtain the feedback information, such information can be stored in the database 304.

The database 304 can be any type of database or memory, and can be associated with the electronic messaging service 302, the rating engine 306, on a network or at the client device 130. Database 304 comprises a dataset of data and metadata associated with local and/or network information related to users, services, applications, messaging content (e.g., email messages) and the like. Such information can be stored and indexed in the database 304 independently and/or as a linked or associated dataset. It should be understood that the data (and metadata) in the database 304 can be any type of information and type, whether known or to be known, without departing from the scope of the present disclosure.

According to some embodiments, database 304 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 304 can be any type of information related to a user, content, a device, an application, a service provider, a content provider, whether known or to be known, without departing from the scope of the present disclosure.

According to some embodiments, database 304 can store rating data for an electronic message and rating data for each electronic message recipient. Database 304 can comprise an aggregate rating table which includes an entry (e.g., a row) for each electronic message for which an aggregate rating is being determined, e.g., the entry can comprise, for each electronic message, an identifier (e.g., a primary key) that uniquely identifies the electronic message and an aggregate rating determined using the explicit and implicit rating data of the recipients of the electronic message. In some embodiments, the aggregate rating table may include temporal information, such as and without limitation an expiration (e.g., an expiration date and time). Database 304 can further store rating data for each message recipient and each electronic message for which an aggregate rating is being determined, e.g., an entry can comprise, for given electronic message and corresponding recipient, explicit rating input and/or implicit rating input of the electronic message by the recipient, an identifier that uniquely identifies the electronic message, an identifier that uniquely identifies the recipient, and the primary key identifying the entry in the aggregate rating table for the electronic message.

The network 310 can be any type of network such as, but not limited to, a wireless network, a local area network (LAN), wide area network (WAN), the Internet, or a combination thereof. The network 310 facilitates connectivity of the rating engine 306, electronic messaging service 302, client computing device 320, and the database of stored resources 304. Indeed, as illustrated in FIG. 3, either or both of rating engine 306 and electronic messaging service 302 can be directly connected with database 304 by any known or to be known method of connecting and/or enabling communication between such devices and resources.

The principal processor, server, or combination of devices that comprises hardware programmed in accordance with the special purpose functions herein is referred to for convenience as rating engine 306. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

The information processed by the rating engine 306, e.g., aggregate and recipient rating data, can be supplied to the database 304 in order to ensure that the information housed in the database 304 is up-to-date as the disclosed systems and methods leverage real-time information and/or behavior associated with electronic messages, as discussed in more detail below.

It should be understood that the modules discussed herein are non-exhaustive, as additional or fewer modules (or sub-modules) may be applicable to the embodiments of the systems and methods discussed. The operations, configurations and functionalities of each module, and their role within embodiments of the present disclosure will be discussed with reference to FIG. 4.

Figure 4:
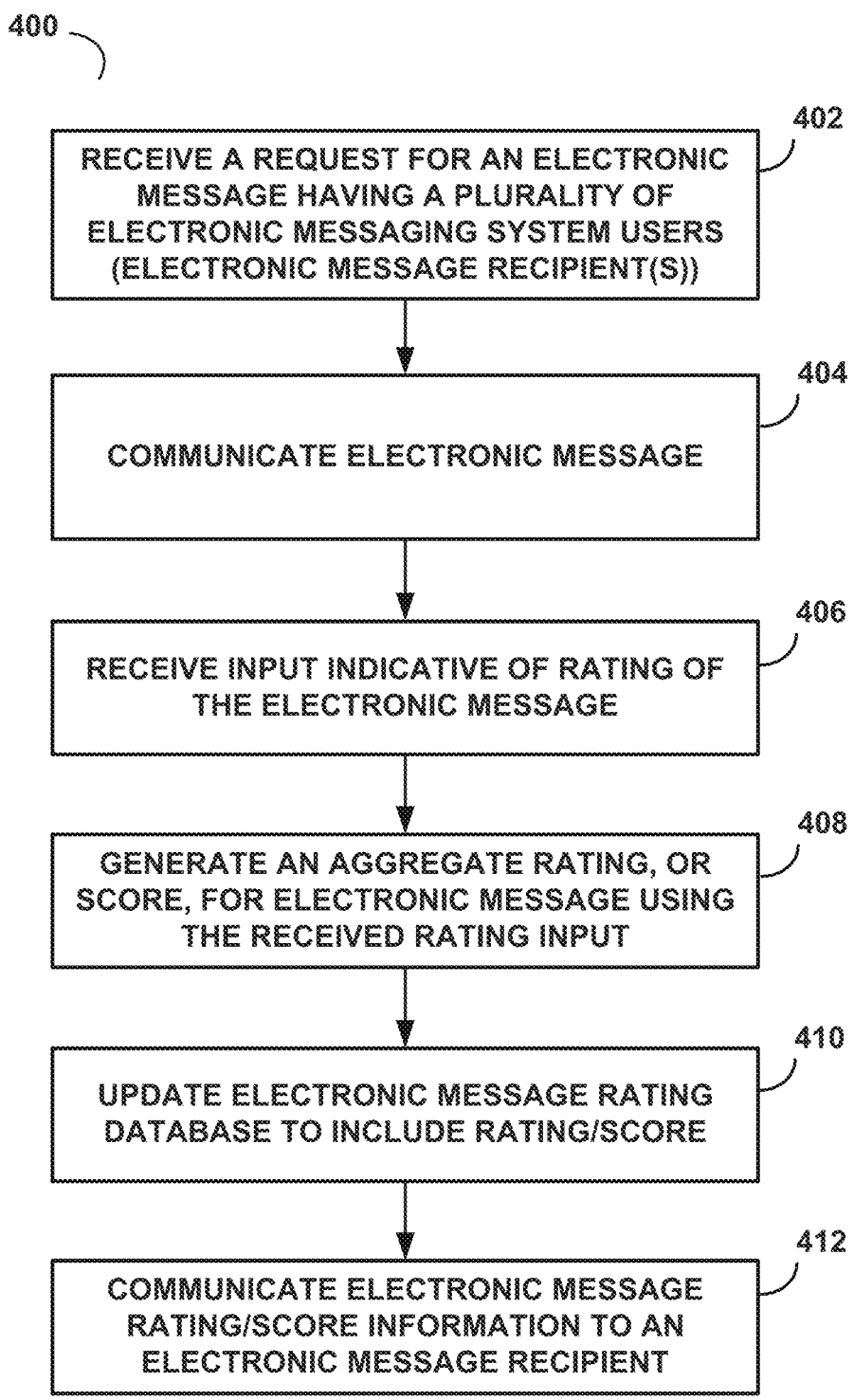
FIG. 4 is a flowchart illustrating steps performed in accordance with some embodiments of the present disclosure.

FIG. 4 provides a process flow overview in accordance with one or more embodiments of the present disclosure.

Process 400 of FIG. 4 details steps performed in accordance with exemplary embodiments of the present disclosure for automatically generating aggregate ratings for electronic messages directed to recipients, e.g., users of the electronic messaging service 302. According to some embodiments, as discussed herein with relation to FIG. 4, the process involves receiving input indicative of a rating by a recipient of the electronic message. In response to receiving such input, the process automatically aggregates rating input (explicit and/or implicit rating input) from a number of recipients of an electronic message to generate an aggregate rating for the electronic message, and communicates aggregate rating information to a client computing device, such communication resulting in a user interface to be displayed (or updated) at the client computing device based on the aggregate rating determined for the electronic message, as discussed in more detail below.

At step 402, a request is received by the electronic message service 302 for an electronic message. According to some embodiments, a determination is made whether the requested electronic message is one for which an aggregate rating is to be generated. Such a determination can be made at the time that the electronic message is received by the electronic message service 302. In one example, electronic message services 302 can make a determination to generate an aggregate rating for an electronic message in a case that the electronic message has multiple recipients. As yet another example, an electronic message may be identified for an aggregate rating based on the sender, e.g., an electronic message whose sender is found in a listing of senders is identified as being an electronic message for which an aggregate rating is to be generated.

In some embodiments, the electronic message service 302 can query the database 304 to determine whether an aggregate rating exists for the requested electronic message. If so, the aggregate rating can be communicated along with the requested electronic message.

At step 404, the requested electronic message is communicated (e.g., sent or transmitted over network 310) to a client computing device in response to the request. Communication of the electronic message to the client computing device results in the electronic message, or some portion thereof, being displayed at the client computing device in a user interface, which comprises a rating user interface element, such that the electronic message (or some portion thereof) and the rating user interface element are included in the user interface displayed at the client computing device. The rating user interface element is selectable by the user of the client computing device, e.g., a recipient of the electronic message, to rate the electronic message.

FIG. 5 provides an example of a user interface display of an electronic message. In the example shown in FIG. 5, the electronic message is an electronic mail message. The user interface 500 display includes a display area 506 displaying a portion of the electronic mail message. A scrolling capability may be provided in the user interface 500, which may include both horizontal and vertical scrolling capabilities. In addition, the user interface 500 display includes a user interface element 502, which is selectable by the user to input an explicit (or express) rating of the electronic mail (or email) message. The user interface 500 comprises a number of user interface elements 504 with which implicit (or implied) rating input can be received.

Referring again to FIG. 4, at step 406 of FIG. 4, rating input is received from the client computing device. The received input is indicative of a rating of the electronic message by the user. The input can be received via the rating user interface element, e.g., user interface element 502 of FIG. 5. In which case, the input is indicative of an explicit rating by the user. In the example shown in FIG. 5, the user can provide an explicit rating by clicking on one of the five star icons. The user can hover over each star, and a prompt indicating a corresponding rating can be displayed in response. In one exemplary case, from left to right, the first star can represent an extreme dislike of the electronic message, the second star can represent a somewhat lesser dislike than indicated by the first star, the third star can represent a neutral interest in the electronic mail message's content, the fourth star (moving from left to right) can indicate that the user likes the electronic message's contents, and the fifth stare can indicate that the user loves the content of the electronic mail message.

FIG. 6 provides another example of an explicit rating user interface comprising a number of user interface elements, each of which is selectable by the user to provide an explicit rating of an electronic message. In the example shown in FIG. 6, input can be received via any of the user interface elements 602-606. Although not shown in the example, a user interface element can be provided for purposes of receiving negative feedback, e.g., a user interface element for receiving feedback indicating an extreme dislike, a dislike, etc.

Alternatively, or in addition to an explicit rating, the user's behavior (or action(s) performed) in connection with the electronic message can be received and used as implicit (or implied) rating input. An action taken by the user can be a positive or a negative action. Some examples of positive actions that might be taken by a user (or electronic message recipient) in connection with an electronic message include moving the electronic message from a spam folder to the user's inbox (or other folder), clicking on a universal resource locator (or link) contained in the electronic message, moving the electronic message (from the user's inbox) to a personal folder, flagging (e.g., starring) the electronic message (to indicate that it is a "favorite"), or the like.

In accordance with some embodiments disclosed herein, a link contained in an electronic message can be associated with an offer, such as an offer for a product(s) or service(s) by an entity. In one example, the link is selectable to navigate to a web site, or web page, for more information about the offer. Selection of the link within an electronic message can be considered to be a positive action. An electronic message can comprise more than one offer. As discussed herein, in accordance with some embodiments, each offer can have an aggregate rating.

Some examples of negative actions include deleting the electronic message (e.g., moving the electronic message to trash bin), marking the electronic message as spam (e.g., moving the electronic message to a spam folder), or the like. Each positive action and each negative action can have an associated implicit rating value. For example, a positive action can have a positive rating value (e.g., a value of 1), while a negative action can have a negative rating value (e.g., a value of −1). Of course, different positive and negative implicit rating values can be used, and different implicit rating values can be used for different actions. For example, an action marking the electronic message as spam might have a greater negative rating value (such as −2) than an action deleting the electronic message (which might be assigned a −1 rating value).

With reference to FIG. 5, user interface 500 includes some examples of user interface controls that may be used by the user to take an action with respect to the electronic mail message displayed in the user interface 500. In the example of FIG. 5, the user interface 500 includes controls 508 to reply to the sender, "reply to all", and to forward the electronic message, each of which is considered to be a positive action. Other positive actions that can be initiated via controls included in user interface 500 include archive control 510 and move 512, both of which are considered to be positive actions (or positive feedback) in that they both involve retention of the electronic mail message by the user. On the other hand, user interface controls 514 and 516, which involve disposal of the electronic mail message, are considered to be negative actions (or negative feedback).

Referring again to FIG. 4, at step 408, the rating engine 306 generates an aggregate rating, or score, for the electronic message using input received from a number of the recipients of the electronic message. In some embodiments, the input (explicit and/or implicit) of each recipient of the number is maintained, e.g., in a database or other data store, and is combined (or aggregated) with the input of each other recipient of the number of recipients. In some embodiments, the aggregate rating value determined for an electronic message is maintained as well as the rating data of each recipient of the electronic message in a database (or data store), such as database 304.

FIG. 7 provides an exemplary illustration of a schematic diagram for rating information storage. The illustrative schema shown in FIG. 7 can be used to store rating data in database 304. In accordance with the schema shown in FIG. 7, the database 304 can comprise an aggregate rating table 702 and a user rating table 722. The aggregate rating table 702 includes an entry (e.g., a row) 712 for each electronic message. Each row 712 comprises a number of fields, including field 704 containing an identifier that uniquely identifies the electronic message (e.g., a primary key in the message rating table 704), or portion of the electronic message with which an aggregate rating is associated, and field 706 containing the aggregate rating determined (for the electronic message, or portion thereof, uniquely identified in field 704) using the explicit and implicit rating input of each of the recipients of the electronic message that provided rating input. In some embodiments, the message rating table 702 may include temporal information, which is stored in field 708, such as and without limitation an expiration (e.g., an expiration date and time, such an expiration date and time of an offer contained in the electronic message). In some embodiments, the expiration data stored in field 708 can be used in selecting electronic messages for display and/or ordering electronic messages in a display, as is discussed in more detail below.

User rating table 722 stores data for each recipient of the electronic message. Each row 732 corresponds to one electronic message (or portion thereof) and one recipient of the electronic message. Each row 732 can comprise a number of fields identifying the electronic message (or portion thereof), the recipient and the rating input of the recipient. In the example shown in FIG. 7, fields 724-728 store the electronic message and user identification data. In the example, field 724 stores a unique identifier for an instance of the electronic message (or a portion of the electronic message) corresponding to a specific user (or recipient) identified (by a unique user identifier) in field 726. In some embodiments, field 724 can be eliminated and fields 726 and 728 can be used in combination as the identifier of a given recipient's instance of the electronic message.

In the example shown in FIG. 7, field 704 of the aggregate rating table 702 and field 724 of the user rating table 722 store a global message identifier (GMID). The GMID uniquely identifies an aggregate rating associated with an electronic message or a portion of the electronic message. In some embodiments, an electronic message may have multiple aggregate ratings associated therewith, and each aggregate rating has an entry (or row) in the aggregate rating table 702 and the user rating table 722, which stores the unique GMID. In other words, an aggregate rating of an electronic message can be an aggregate rating of a portion of the electronic message. By way of one non-limiting example, an electronic message can include multiple offers (e.g., with a user-selectable link to allow the user to navigate to the offer's web page), and each offer contained in the electronic message has an aggregate rating entry in aggregate rating table 702, which stores an aggregate rating for the offer, and an entry in the user rating table 722 for each recipient of the electronic message. As a further non-limiting illustration, considering an electronic message containing two offers; the aggregate rating table 702 includes two entries (each with a unique GMID) one for each offer, and each user has two entries in the user rating table 722 (each with the unique GMID assigned to the corresponding offer) one for each offer.

In some embodiments, a GMID can be a randomly-generated value (e.g., generated using randomly-selected data) that uniquely identifies an aggregate rating (e.g., an aggregate rating for an electronic message or a portion thereof). In some embodiments, a GMID can be generated for an electronic message (or portion thereof) using information extracted from the electronic message (or portion thereof). In one example, the GMID can be a hash value of the extracted information. Examples of information that can be extracted from an electronic message and used to generate a GMID (e.g., using a hash function) include a domain (e.g., the electronic message sender's domain, a domain in a link contained in the electronic message, etc.), some or all of the subject of the electronic message, etc. In a case that the GMID is being generated using a portion of an electronic message, such as a link in the electronic message, the information that is extracted and used to generate the GMID can include information from the link, which information can include information retrievable using information from the link, such as and without limitation a title (e.g., of the web page identified in the link), content and/or metadata of one or more images referenced by the link (e.g., image(s) contained in the web page identified in the link), etc. In some embodiments, the GMID can be generated using a combination of a randomly-generated value and information extracted from the electronic message (or portion thereof). Of course, other techniques can be used to generate an identifier that uniquely identifies a message (or some portion thereof).

Field 730 of the user rating table 722 contains rating input provided by the recipient identified in field 726. As can be seen illustratively in field 730, the user rating table can store both explicit rating data and implicit rating data. While a single data value is shown for the implicit rating data, it should be apparent that multiple data values can be stored. Furthermore and while a single field (field 730) is used in the example to store a recipient's rating input, rating input of a recipient can be stored using multiple fields. In some embodiments, the implicit rating input can be stored as a vector comprising a field for each action that can be performed by the recipient on the electronic message and can impact the recipient's implicit rating of the electronic message. In some embodiments, the user rating data can store a combined rating, which combines explicit rating and implicit rating data.

In some embodiments, an implicit rating value, such as the value shown in field 730, is determined for a recipient as follows:

$$\text{ImplicitRating} = ((\Sigma_{i=1}^{n} \text{PARV}_i + \Sigma_{j=1}^{m} \text{NARV}_j)/\text{no.actions}) * SF, \quad \text{Eq. (1)}$$

where PARV denotes a value associated with the $i^{th}$ positive action of a number, n, of possible positive actions that can be taken by a recipient, NARV denotes a value associated with the $j^{th}$ negative action of a number, m, of possible negative actions that can be taken by the recipient, and SF denotes a scaling factor. In one example, the scaling factor is 1.5. It should be apparent, however, that any scaling factor can be used.

To further illustrate, in Equation (1) above, $\text{PARV}_i$ and $\text{NARV}_j$ can be zero if the recipient has not taken the corresponding action with respect to the electronic message and can be a non-zero value if the recipient has taken the action. Assuming that the non-zero value for the $i^{th}$ positive action is 1 and the non-zero value for $j^{th}$ negative action is −1, $\text{PARV}_i$ is equal to 1 if the recipient has taken the corresponding positive action and $\text{NARV}_j$ is equal to −1 if the recipient has taken the corresponding negative action. As discussed herein, other values can be used for positive and negative actions, the same or different values can be assigned to different positive actions, and the same or different values can be assigned to different negative action.

Referring again to FIG. 4, as discussed, the rating engine 306 generates an aggregate rating, or score, for the electronic message (or portion thereof) using input from a number of the recipients of the electronic message at step 408. The aggregate rating is determined using the explicit and implicit rating input of each recipient of the electronic message that provide such input. In some embodiments, the aggregate rating is an average determined using a rating of the electronic message (or portion thereof) determined for each recipient of the electronic message. In one example, the aggregate rating can be expressed as follows:

$$\text{Aggregate Rating} = (\Sigma_{r=1}^{N} \text{RR}_r)/N, \quad \text{Eq. (2)}$$

where RR denotes a recipient rating of the electronic message (or portion thereof) by the $r^{th}$ recipient and N denotes the number of recipients. As is discussed herein, the value of RR is determined by combining explicit and implicit rating values for the recipient. In some embodiments, the number of recipients, N, can be equal to the number of recipients that have a non-zero rating of the electronic message (or portion thereof). Alternatively, the number of recipients, N, can be equal to the number of recipients to which the electronic message is directed.

An aggregate rating for an electronic message (or portion thereof) can be determined multiple different times. For example, an aggregate rating can be determined each time explicit rating or implicit rating input is received for the electronic message (or portion thereof), when a recipient's user interface is to be displayed and/or updated, etc. A recipient may not have provided an explicit rating and may not have acted on the electronic message at a time that an aggregate rating is determined. In such a case, the recipient's rating can have an initial value (e.g., 0) in the user rating table 722. In a case that the recipient provides an explicit rating of the electronic message but does not provide any implicit rating input (e.g., does not take any positive or negative action in connection with the electronic message, or a portion of the electronic message with which an aggregate rating is associated), the recipient's explicit rating is used as the recipient's rating. In a case that the recipient provides implicit rating input (e.g., performs one or more positive and/or negative actions in connection with the electronic message, or a portion of the electronic message having an associated aggregate rating), the recipient's implicit rating (e.g., determined using Equation (1)) is used as the recipient's rating. In a case that the recipient has both explicit rating data and implicit rating data, the rating data is combined to determine the recipient's rating of the electronic message (or the recipient's rating of the portion of the electronic message). In one example, an average of the recipient's explicit and implicit rating data is determined to be the recipient's combined rating (e.g., sum(explicit rating and implicit rating)/2). A scaling factor can be used to weight an explicit rating higher or lower than an implicit rating.

Referring again to FIG. 4, the aggregate rating for the electronic message (or a portion thereof) determined at step 408 (e.g., using Equation (2)) is stored in the aggregated rating table 702. In the example shown in FIG. 7, the aggregate rating of 3.6 is stored in field 706 of row 712 of the aggregate rating table 702. As discussed above, in some embodiments, the aggregate rating is determined from the user rating data stored in field 730 of each row 732 corresponding to a recipient of the electronic message. The global message identifier (or GMID) identified in fields 704 and 728 can be used to identify each instance of row 732 in the user rating table 722 corresponding to the electronic message (or portion thereof) for which the aggregate rating is being generated.

At step 412, information indicative of the aggregate rating determined for the electronic message (or portion thereof) is communicated to a client computing device of a recipient of the electronic message. Communication of the aggregate rating information to a client computing device results in the user interface display being updated based on the aggregate rating determined for the electronic message using the received rating input. In one example, the information that is communicated to the client computing device can be the aggregate rating determined for the electronic message, and the user interface can display the aggregate rating along with at least a portion of the electronic message (e.g., in a listing of electronic messages including the electronic message with the aggregate rating determined for the electronic message), as illustrated in the example shown in FIG. 8.

In the example shown in FIG. 8, user interface 800 comprises a display list of a number of electronic mail messages. In the list, each row contains information from the electronic mail message, e.g., sender, subject and date or time sent. In addition, each row can include the aggregate rating (if one is available) for the corresponding electronic mail message, as shown in column 802 of user interface 800. The list comprises a number of electronic mail messages for the recipient. The recipient is able to make use of the aggregate rating associated with an electronic mail message to determine whether to attend to the electronic message in some manner. In one example, the recipient may elect to read an electronic message based on its rating. In another example, the recipient may elect to read the electronic message with the highest aggregate rating, electronic mail message 804, first, and may elect to postpone reading (or not even read) the electronic mail messages 806 that have a moderate aggregate rating. In one example, the electronic mail messages in the list can be sorted by aggregate rating, so that the electronic mail messages with the highest aggregate rating are displayed first. The list can be initially displayed sorted by aggregate rating and/or the recipient can initiate the sort, e.g., by clicking on column 802.

For purposes of further illustration, the recipient can open the electronic message to display the electronic mail message in the manner shown in the example of FIG. 5. As discussed herein, the recipient can provide explicit rating input via user interface rating element 502 and implicit rating input using user interface elements 508-516, for example.

The example shown in FIG. 5 illustrates an electronic message containing one offer. As discussed herein, in accordance with some embodiments, an electronic message can include multiple offers, each of which has an aggregate rating. In such a case, the user interface display of the electronic message can include a display of the aggregate rating associated with each offer contained in the electronic message. As yet another example, in accordance with one or more embodiments, multiple aggregate ratings can be determined for an electronic message containing one offer, e.g., one aggregate rating can be of the electronic message as a whole and the other aggregate rating can be for a portion of the electronic message (e.g., an offer contained in the electronic message).

In some embodiments, the recipient can hover the mouse over the aggregate rating, e.g., aggregate rating display 808, resulting in a display, such as display 900 shown in FIG. 9. In the example shown in FIG. 9, the aggregate rating is numerically displayed together with a numeric representation of the maximum possible aggregate rating. In addition, a ratings breakdown 902 is provided, which shows each recipient rating value used in generated the aggregate rating, and the percentage of recipients for each recipient rating value. For example, 42 percent of the recipients have given the electronic mail message a five-star rating. The information provided in display 900 can further assist the recipient in determining what action to take with respect to the electronic mail message.

In the example shown in FIG. 9, prompt 904 is selectable by the recipient to obtain additional information. In some embodiments, a recipient can provide additional rating information, such as a textual explanation of the recipient's rating (and/or action taken) with respect to the electronic mail message, or the like. By clicking on the prompt 904, the recipient can obtain the additional rating information.

As yet another example of a communication of aggregate rating information, FIG. 10 provides an example of a summary display of a number of electronic messages. In the example, each electronic message in display area 1002 of the user interface 1000 has an aggregate rating. In some embodiments, the electronic messages with the highest aggregate rating relative to other electronic messages of the recipient are selected for display in area 1002 of the user interface 1000.

In the example, display area 1002 is divided into eight regions; however, the display area 1004 can be divided into more or less regions, so as to accommodate the display of more or fewer electronic messages. Each of the regions of display area 1002 is for use in displaying information extracted from (or information obtained from information extracted from) an electronic message.

In the example shown in FIG. 10, each electronic message included in the user interface 1000 display, contains an offer, e.g., product, service, etc., which is shown pictorially, together with information identifying the source of the offer, e.g., Groupon®, Pottery Barn®, etc. In some embodiments, the aggregate rating can reflect an aggregate rating for the offer contained in the electronic message. In such a case, the display area 1004 can be used to present to the recipient a number of offers determined by recipient of the electronic message to be compelling. The compelling offers can be identified as the electronic messages sent to the recipient which have the highest aggregate rating, where each aggregate rating is determined from the explicit and/or implicit rating input received from a number of recipients of the electronic message containing the offer. The recipient can use the aggregate rating associated with an offer to assist the recipient in determining whether or not the offer is worthwhile.

In some embodiments, the order of the electronic messages selected for display in the display area 1002 is based on the aggregate rating of each selected electronic message. In one example, the highest-rated electronic message is positioned in the top left region 1004 of the display area 1002 and the lowest-rated electronic message is positioned in the bottom right region 1006 of the display area 1002. Alternatively, the expiration information stored in the expiration field 708 of the aggregate rating table 702, which can indicate the expiration date and/or time of an offer, can be used to order the offers displayed in display area 1002. In one example, the offers can be ordered such that the offer that is closest to expiration is shown in region 1004 and the offer that has the most time remaining before expiration is shown in region 1006. Although not shown in the example of FIG. 10, the display area 1002 can comprise an associated aggregate rating for each of the offers displayed in the display area 1002.

The aggregate rating generated as discussed herein can be used as a crowdsourced feedback mechanism for an electronic message (and/or an offer contained in an electronic message), which aggregate rating is available in the same display that displays electronic messages (or the offers contained in electronic messages). The mechanism advantageously provides a visibility into the electronic message(s) (and/or offer(s) contained in the electronic message(s)), which visibility into the electronic message is available (via the aggregate rating) without opening and/or reading the electronic message.

In some embodiments, the aggregate rating determined for an electronic message and used for a given recipient is determined from the explicit (and/or implicit) ratings of other recipients of the electronic message that are in a social circle of the recipient. The recipient's social circle can be expressly selected by the recipient, identified using the recipient's address book, identified from an affinity group (or groups) of a social network, or the like.

An internal architecture will now be described with reference to FIG. 11. As shown in FIG. 11, internal architecture 1100 of a computing device(s), computing system, computing platform, user devices, set-top box, smart TV and the like includes one or more processing units, processors, or processing cores, (also referred to herein as CPUs) 1112, which interface with at least one computer bus 1102. Also interfacing with computer bus 1102 are computer-readable medium, or media, 1106, network interface 1114, memory 1104, e.g., random access memory (RAM), run-time transient memory, read only memory (ROM), media disk drive interface 1120 as an interface for a drive that can read and/or write to media including removable media such as floppy, CD-ROM, DVD, media, display interface 1110 as interface for a monitor or other display device, keyboard interface 1116 as interface for a keyboard, pointing device interface 1118 as an interface for a mouse or other pointing device, and miscellaneous other interfaces not shown individually, such as parallel and serial port interfaces and a universal serial bus (USB) interface.

Memory 1104 interfaces with computer bus 1102 so as to provide information stored in memory 1104 to CPU 1012 during execution of software programs such as an operating system, application programs, device drivers, and software modules that comprise program code, and/or computer executable process steps, incorporating functionality described herein, e.g., one or more of process flows described herein. CPU 1112 first loads computer executable process steps from storage, e.g., memory 1004, computer readable storage medium/media 1006, removable media drive, and/or other storage device. CPU 1112 can then execute the stored process steps in order to execute the loaded computer-executable process steps. Stored data, e.g., data stored by a storage device, can be accessed by CPU 1112 during the execution of computer-executable process steps.

Persistent storage, e.g., medium/media 1106, can be used to store an operating system and one or more application programs. Persistent storage can also be used to store device drivers, such as one or more of a digital camera driver, monitor driver, printer driver, scanner driver, or other device drivers, web pages, content files, playlists and other files. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 1128 typically provides information communication using transmission media through one or more networks to other devices that use or process the information. For example, network link 1128 may provide a connection through local network 1124 to a host computer 1126 or to equipment operated by a Network or Internet Service Provider (ISP) 1130. ISP equipment in turn provides data communication services through the public, worldwide packet-switching communication network of networks now commonly referred to as the Internet 1132.

A computer called a server host 1134 connected to the Internet 1132 hosts a process that provides a service in response to information received over the Internet 1132. For example, server host 1134 hosts a process that provides information representing video data for presentation at display 1110. It is contemplated that the components of system 1100 can be deployed in various configurations within other computer systems, e.g., host and server.

At least some embodiments of the present disclosure are related to the use of computer system 1100 for implementing some or all of the techniques described herein. According to one embodiment, those techniques are performed by computer system 1100 in response to processing unit 1112 executing one or more sequences of one or more processor instructions contained in memory 1104. Such instructions, also called computer instructions, software and program code, may be read into memory 1104 from another computer-readable medium 1106 such as storage device or network link. Execution of the sequences of instructions contained in memory 1104 causes processing unit 1112 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 1100. Computer system 1100 can send and receive information, including program code, through the networks, among others, through network link and communications interface. In an example using the Internet, a server host transmits program code for a particular application, requested by an electronic message sent from computer, through Internet, ISP equipment, local network and communications interface. The received code may be executed by processor 1102 as it is received, or may be stored in memory 1104 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:

receiving, at a server computing device in an electronic messaging system and over an electronic communications network from a number of client computing devices, a request for an electronic message, the electronic message is directed to a plurality of recipients by a sender, each client computing device of the number corresponding to a recipient of the plurality of recipients;

communicating, via the server computing device over the electronic communications network to the number of client computing devices, the electronic message, communication of the electronic message to a client computing device of the number of client computing devices resulting in display, at the client computing device, of the electronic message in a user interface along with a rating user interface element selectable to provide an explicit rating of content of the electronic message;

receiving, at the server computing device over the electronic communications network, input indicative of a rating of the content of the electronic message by each of a number of recipients of the plurality of recipients;

determining, via the server computing device, an aggregate rating for the electronic message using the input indicative of a rating of the content of the electronic message received from multiple recipients of the plurality of recipients;

communicating, via the server computing device over the electronic communications network to a user of the client computing device, information indicative of the aggregate rating determined for the electronic message using the input indicative of a rating received from the multiple recipients of the electronic message, the user of the client computing device being a recipient of the plurality of the recipients of the electronic message, communication of the aggregate rating information to the client computing device resulting in a listing being displayed in the user interface at the computing device, the listing comprising an entry for each of multiple electronic messages directed to the user, the aggregate rating determined for the electronic message using the received input indicative of a rating of the electronic message received from multiple recipients of the electronic message being displayed as a user-selectable average rating indicator, when the listing is displayed, in one entry, of the listing, corresponding to the electronic message, the average rating indicator displayed in the listing for the electronic message is selectable by the user to display a ratings breakdown comprising information showing each rating value used in generating the aggregate rating and a percentage of recipients associated with each rating value.

2. The method of claim 1, the aggregate rating of the electronic message is an aggregate rating of a portion of the content of the electronic message.

3. The method of claim 1, the input indicative of a rating of the electronic message is indicative of the explicit rating of the electronic message received via the rating user interface element.

4. The method of claim 1, further comprising:
receiving, at the server computing device, input indicative of an action with respect to the electronic message taken by the recipient of the electronic message;
determining, via the server computing device, an implicit rating of the electronic message by the recipient of the electronic message based on the action taken by the recipient in connection with the electronic message, and
using the implicit rating in determining the aggregate rating for the electronic message.

5. The method of claim 4, the action taken by the recipient of the electronic message in connection with the electronic message comprises a selection, by the recipient of the electronic message, of a universal resource locator contained in the electronic message.

6. The method of claim 4, the action taken by the recipient of the electronic message in connection with the electronic message comprises an indication, by the recipient of the electronic message, that the electronic message is spam.

7. The method of claim 4, the action taken by the recipient of the electronic message in connection with the electronic message comprises an indication, by the recipient of the electronic message, that the electronic message is not spam.

8. The method of claim 4, the action taken by the recipient of the electronic message in connection with the electronic message comprises an indication that the recipient of the electronic message saved the electronic message to a personal folder.

9. The method of claim 4, the action taken by the recipient of the electronic message in connection with the electronic message comprises an indication that the recipient of the electronic message deleted the electronic message.

10. The method of claim 4, the action taken by the recipient of the electronic message in connection with the electronic message comprises an indication that the recipient of the electronic message forwarded the electronic message to another user.

11. The method of claim 1, further comprising:
receiving, by the computing device over the electronic communications network, input indicative of an explicit rating of the content of the electronic message by a given recipient of the plurality of recipients; and
receiving, by the computing device over the electronic communications network, input indicative of an implicit rating of the electronic message by the given recipient of the plurality of recipients;
determination of the aggregate rating for the electronic message using the input indicative of a rating of the electronic message received from the given recipient comprising combining the explicit rating and the implicit rating.

12. The method of claim 1, communication of the information indicative of the aggregate rating further comprising:
selecting, via the server computing device, the number of electronic messages directed to the user for display in the listing, each electronic message of the number having an aggregate rating and each electronic message of the number being selected for the listing in the user interface based on its aggregate rating relative to other electronic messages directed to the user.

13. The method of claim 12, an electronic message of the number of electronic messages displayed in the listing containing an offer, the aggregate rating of the electronic message comprises an aggregate rating of the offer contained in the electronic message.

14. The method of claim 13, the information about an electronic message comprising the aggregate rating of the offer, and the information about the offer and at least a portion of the summary display is selectable in the displayed listing by the user to obtain additional information about the offer.

15. A non-transitory computer-readable storage medium tangibly encoded with computer-executable instructions, that when executed by a processor associated with a computing device, performs a method comprising:
receiving, in an electronic messaging system over an electronic communications network from a number of client computing devices, a request for an electronic message, the electronic message is directed to a plurality of recipients by a sender, each client computing device of the number corresponding to a recipient of the plurality of recipients;
communicating, over the electronic communications network to the number of client computing devices, the electronic message, communication of the electronic message to a client computing device of the number of client computing devices resulting in display, at the client computing device, of the electronic message in a user interface along with a rating user interface element selectable to provide an explicit rating of content of the electronic message;
receiving, over the electronic communications network, input indicative of a rating of the content of the electronic message by each of a number of recipients of the plurality of recipients;
determining an aggregate rating for the electronic message using the input indicative of a rating of the content of the electronic message received from multiple recipients of the plurality;
communicating, over the electronic communications network to a user of the client computing device, information indicative of the aggregate rating determined for the electronic message using the input indicative of a rating received from the multiple recipients of the electronic message, the user of the client computing device being a recipient of the plurality of the recipients of the electronic message, communication of the aggregate rating information to the client computing device resulting in a listing being displayed in the user interface at the computing device, the listing comprising an entry for each of multiple electronic messages directed to the user, the aggregate rating determined for the electronic message using the received input indicative of a rating of the electronic message received from multiple recipients of the electronic message being displayed as a user-selectable average rating indicator, when the listing is displayed, in one entry, of the listing, corresponding to the electronic message, the average rating indicator displayed in the listing for the electronic message is selectable by the user to display a ratings breakdown comprising information showing each rating value used in generating the aggregate rating and a percentage of recipients associated with each rating value.

16. The non-transitory computer-readable storage medium of claim 15, the input indicative of a rating of the content of the electronic message is indicative of the explicit rating of the electronic message received via the rating user interface element.

17. The non-transitory computer-readable storage medium of claim 15, further comprising:
- receiving, over the electronic communications network, input indicative of an explicit rating of the content of the electronic message by a given recipient of the plurality of recipients; and
- receiving, over the electronic communications network, input indicative of an implicit rating of the electronic message by the given recipient of the plurality of recipients;
- determination of the aggregate rating for the electronic message using the input indicative of a rating of the electronic message received from the given recipient comprising combining the explicit rating and the implicit rating.

18. The non-transitory computer-readable storage medium of claim 15, communication of the information indicative of the aggregate rating further comprising:
- selecting the number of electronic messages directed to the user for display in the listing, each electronic message of the number having an aggregate rating and each electronic message of the number being selected for the listing in the user interface based on its aggregate rating relative to other electronic messages directed to the recipient.

19. A computing device comprising:
- a processor;
- a non-transitory storage medium for tangibly storing thereon program logic for execution by the processor, the program logic comprising:
- receiving logic executed by the processor receiving, in an electronic messaging system over an electronic communications network from a number of client computing devices, a request for an electronic message, the electronic message is directed to a plurality of recipients by a sender, each client computing device of the number corresponding to a recipient of the plurality of recipients;
- communicating logic executed by the processor for communicating, over the electronic communications network to the number of client computing devices, the electronic message, communication of the electronic message to a client computing device of the number of client computing devices resulting in display, at the client computing device, of the electronic message in a user interface along with a rating user interface element selectable to provide an explicit rating of content of the electronic message;
- receiving logic executed by the processor for receiving, at the server computing device over the electronic communications network, input indicative of a rating of the content of the electronic message by each of a number of recipients of the plurality of recipients;
- determining logic executed by the processor for determining, via the server computing device, an aggregate rating for the electronic message using the input indicative of a rating of the content of the electronic message received from multiple recipients of the plurality of recipients;
- communicating logic executed by the processor for communicating, over the electronic communications network to a user of the client computing device, information indicative of the aggregate rating determined for the electronic message using input indicative of a rating received from the multiple recipients of the electronic message, the user of the client computing device being a recipient of the plurality of the recipients of the electronic message, communication of the aggregate rating information to the client computing device resulting in a listing being displayed in the user interface at the computing device, the listing comprising an entry for each of multiple electronic messages directed to the user, the aggregate rating determined for the electronic message using the received input indicative of a rating of the electronic message received from multiple recipients of the electronic message being displayed as a user-selectable average rating indicator, when the listing is displayed, in one entry, of the listing, corresponding to the electronic message, the average rating indicator displayed in the listing for the electronic message is selectable by the user to display a ratings breakdown comprising information showing each rating value used in generating the aggregate rating and a percentage of recipients associated with each rating value.

20. The method of claim 1, the multiple recipients excluding the user of the client computing device, the multiple recipients being selected to provide the aggregate rating for the user.

21. The method of claim 1, the aggregate rating determined for the electronic message using the input indicative of a rating of the content of the electronic message received from the multiple recipients, of the plurality of recipients, being displayed in the user interface without opening the electronic message.

22. The method of claim 4, determining an implicit rating of the electronic message by the recipient further comprising:
- maintaining a data structure associated with the recipient, the data structure comprising a plurality of fields associated with a plurality of actions that can performed by the recipient with respect to the electronic message, each field corresponding to a respective action taken by the recipient having a nonzero value;
- in response to receiving the input indicative of the action taken by the recipient with respect to the electronic message, assigning the respective field associated with the action a nonzero value determined based on whether the action is a positive implied action or a negative implied action; and
- determining the recipient's implicit rating of the electronic message comprising aggregating each nonzero value from the data structure.

\* \* \* \* \*